(No Model.)
A. R. HYNSON.
SAFE EDGE SCOOP.
No. 330,834. Patented Nov. 17, 1885.
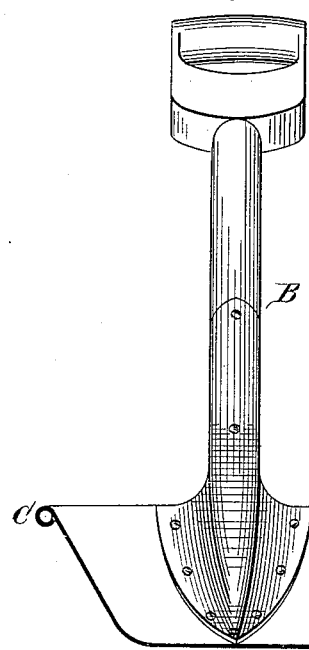
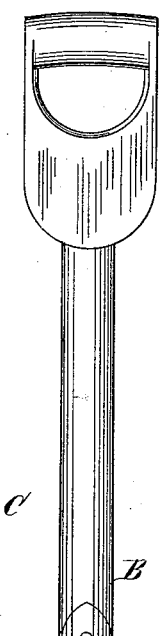
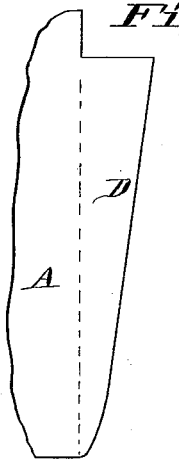
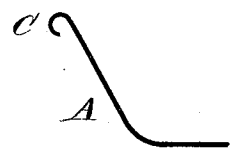
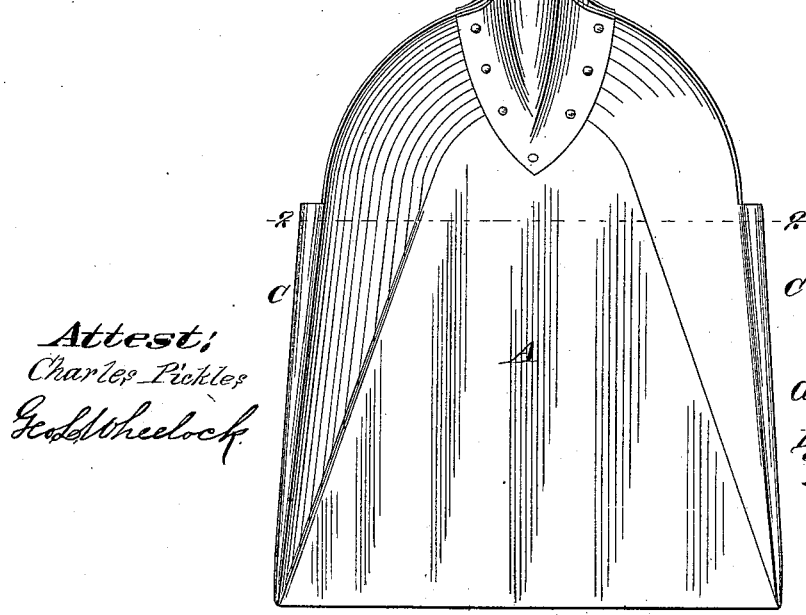
Attest:
Charles Pickles
G. L. Wheelock
Inventor:
A. R. Hynson
By Knight Bros
attys
N. PETERS, Photo-Lithographer, Washington, D. C.

United States Patent Office.

AUGUSTUS R. HYNSON, OF ST. LOUIS, MISSOURI.

SAFE-EDGE SCOOP.

SPECIFICATION forming part of Letters Patent No. 330,834, dated November 17, 1885.

Application filed September 18, 1885. Serial No. 177,511. (No model.)

*To all whom it may concern:*

Be it known that I, AUGUSTUS R. HYNSON, of the city of St. Louis, in the State of Missouri, have invented a new and useful Improvement in Safe-Edge Scoops, of which the following is a full, clear, and exact description, reference being had to the accompanying drawings, forming part of this specification, and in which—

Figure 1 is an elevation or front view of my improved scoop. Fig. 2 is a transverse section of the blade, taken on line 2 2, Fig. 1. Fig. 3 is a detail view of one edge of the scoop before the tube is bent or formed. Fig. 4 shows a slight modification.

My invention relates to an improved form of scoops, intended more particularly for handling country produce; and my invention consists in features of novelty hereinafter fully described, and pointed out in the claim.

Referring to the drawings, A represents the blade, and B the handle, of the scoop secured together in any well-known manner. At each edge of the scoop is a tapering tube, C, which is made quite large at its upper end, and tapers down to a point at its lower end, as shown in Fig 1. It is five-eighths of an inch in diameter (more or less) at its upper end, and comes to a point at its lower end. I prefer to make these tubes in a complete circle in cross-section, as shown in Fig. 2, by curling or bending the part D that projects beyond the blade, as shown in Fig. 3; but they may be made in part of a circle, as shown in Fig. 4, and accomplish the same result.

The object of my invention is to produce a scoop for handling country produce—such as potatoes, apples, cabbages, turnips, &c.—without slicing, cutting, or in any way injuring it, as is usually done with the scoop as ordinarily made, the edge of the scoop as ordinarily made cutting or slicing into the produce as the shovel is thrust forward. It is well known that when this produce is handled with an ordinary scoop it is cut to such an extent that large quantities of it, partly decayed, can be picked out, the decay being due to the cutting. With my improved shovel this difficulty is effectually and thoroughly overcome, because the scoop has no sharp edge that will in any way injure or cut the produce. By making the tubes quite pointed at their lower ends, it will not require any more power to force or make the scoop enter the produce than it requires with any ordinary shovel, and by making the tubes larger as they extend upward the cutting is entirely avoided, because as the height of the sides of the scoop increases the tube increases in size, so that the part of the scoop having the greatest tendency to cut the produce is best protected against it. The tubes could extend all the way to the handle; but I prefer to stop them at a point some distance from the handle, as shown in Fig. 1, it being unnecessary to extend them farther because the produce does not touch the edge of the shovel above this point when the shovel is being thrust forward into the produce.

I claim as my invention—

As an improved article of manufacture, a scoop provided with tapering tubes at its edges, substantially as shown and described, for the purpose set forth.

AUGUSTUS R. HYNSON.

In presence of—
GEO. H. KNIGHT,
SAML. KNIGHT.